(12) United States Patent
Ohashi et al.

(10) Patent No.: US 11,718,201 B2
(45) Date of Patent: Aug. 8, 2023

(54) MOTOR VEHICLE

(71) Applicant: Kabushiki Kaisha F.C.C., Hamamatsu (JP)

(72) Inventors: Tatsuyuki Ohashi, Hamamatsu (JP); Mahmoud Abdelnaby Sayed Abdallah, Hamamatsu (JP); Takaharu Takeshita, Nagoya (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 17/528,060

(22) Filed: Nov. 16, 2021

(65) Prior Publication Data
US 2022/0161685 A1 May 26, 2022

(30) Foreign Application Priority Data
Nov. 24, 2020 (JP) .................. 2020-194412

(51) Int. Cl.
*B60L 58/20* (2019.01)
*B60L 7/16* (2006.01)

(52) U.S. Cl.
CPC .............. *B60L 58/20* (2019.02); *B60L 7/16* (2013.01); *B60L 2200/12* (2013.01); *B60L 2210/40* (2013.01); *B60L 2240/423* (2013.01); *B60L 2240/547* (2013.01)

(58) Field of Classification Search
CPC ........ B60L 58/20; B60L 7/16; B60L 2200/12; B60L 2210/40; B60L 2240/423; B60L 2240/547
See application file for complete search history.

(56) References Cited

U.S. PATENT DOCUMENTS

| | | | | |
|---|---|---|---|---|
| 7,402,919 B2* | 7/2008 | Ishikawa | ............... | B60W 10/08 |
| | | | | 290/400 |
| 2006/0091835 A1* | 5/2006 | Ochiai | .................... | B60L 15/08 |
| | | | | 318/34 |
| 2009/0146493 A1* | 6/2009 | Fujino | ................. | B60L 15/2045 |
| | | | | 307/9.1 |

(Continued)

FOREIGN PATENT DOCUMENTS

| JP | 2002-084780 A | 3/2002 |
|---|---|---|
| JP | 2019-118241 A | 7/2019 |

*Primary Examiner* — Daniel Kessie
*Assistant Examiner* — Brian K Baxter
(74) *Attorney, Agent, or Firm* — Harness, Dickey & Pierce, P.L.C.

(57) ABSTRACT

A motor vehicle has a motor performing power driving and regeneration. The motor includes an inverter, a first power storage device suppling energy to the motor, a power converter and a circuit. The converter has a voltage step down function during the power driving and a voltage step up function during the regeneration. The power converter, with the voltage step down function during the power driving, is connected in the circuit to the first power storage device. During the power driving of the motor, the power converter steps down an output voltage of the first power storage device to supply the energy from the first power storage device to the inverter. During the regeneration in the motor, the power converter steps up a DC voltage of the inverter to recover regenerated energy into the first power storage device.

7 Claims, 19 Drawing Sheets

(56) References Cited

U.S. PATENT DOCUMENTS

| | | | |
|---|---|---|---|
| 2014/0292076 A1* | 10/2014 | Nakamura | B60L 7/16 |
| | | | 307/10.1 |
| 2018/0029473 A1* | 2/2018 | Nishimura | B60L 3/04 |
| 2018/0178656 A1* | 6/2018 | Takegawa | H02P 6/24 |
| 2018/0257496 A1* | 9/2018 | Andoh | B60L 58/15 |
| 2018/0334046 A1* | 11/2018 | Lee | B60L 15/007 |
| 2019/0061553 A1* | 2/2019 | Yang | B60L 58/22 |
| 2020/0298710 A1* | 9/2020 | Masaki | H02P 4/00 |
| 2021/0203232 A1* | 7/2021 | Mihashi | B60L 15/20 |
| 2022/0097564 A1* | 3/2022 | Yamashita | B60K 6/48 |
| 2022/0097673 A1* | 3/2022 | Ohama | B60L 58/12 |
| 2022/0161664 A1* | 5/2022 | Takeshita | H02M 1/007 |
| 2022/0161684 A1* | 5/2022 | Sayed Abdallah | B60L 50/51 |

\* cited by examiner

[Fig. 1]
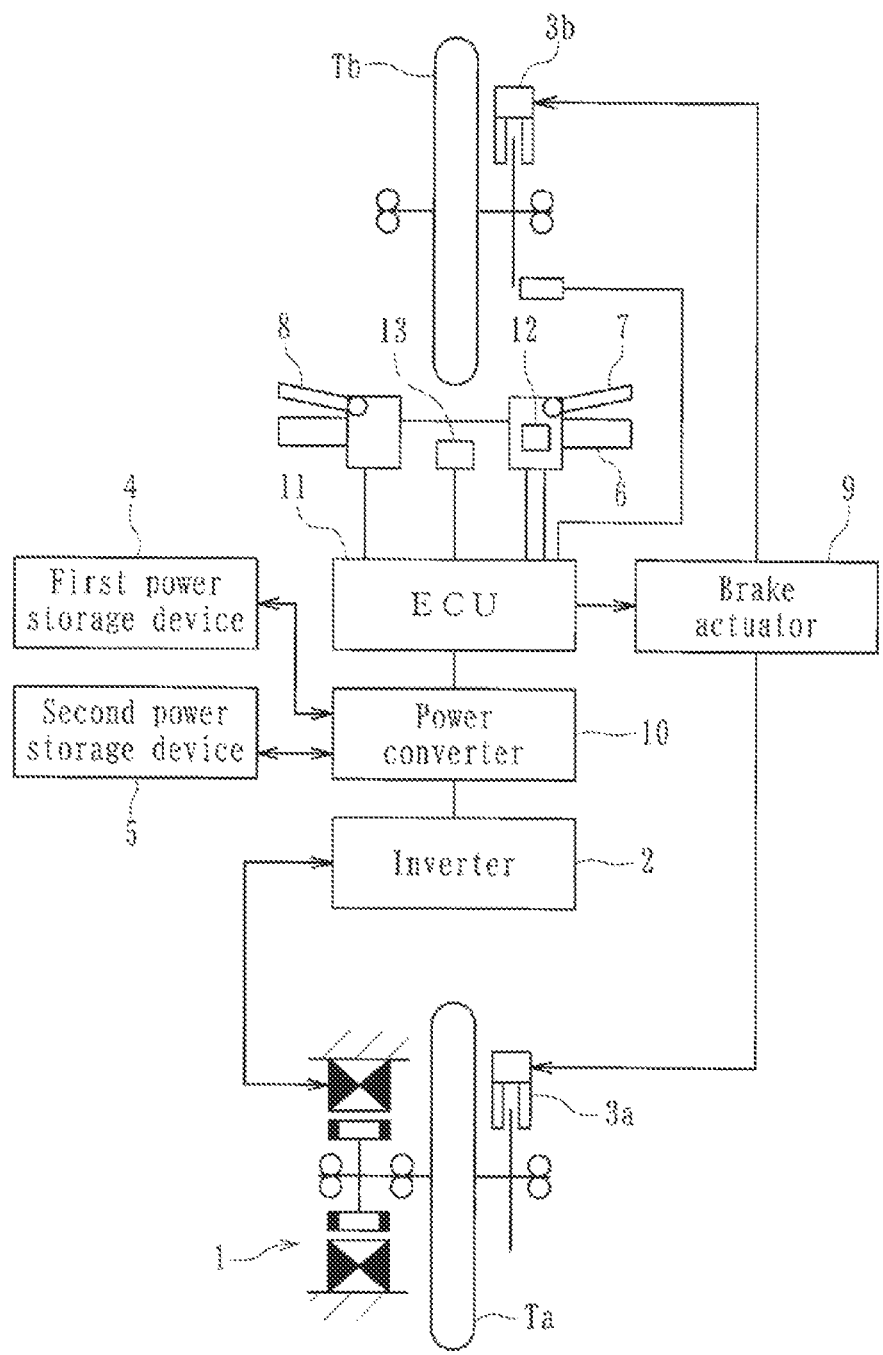

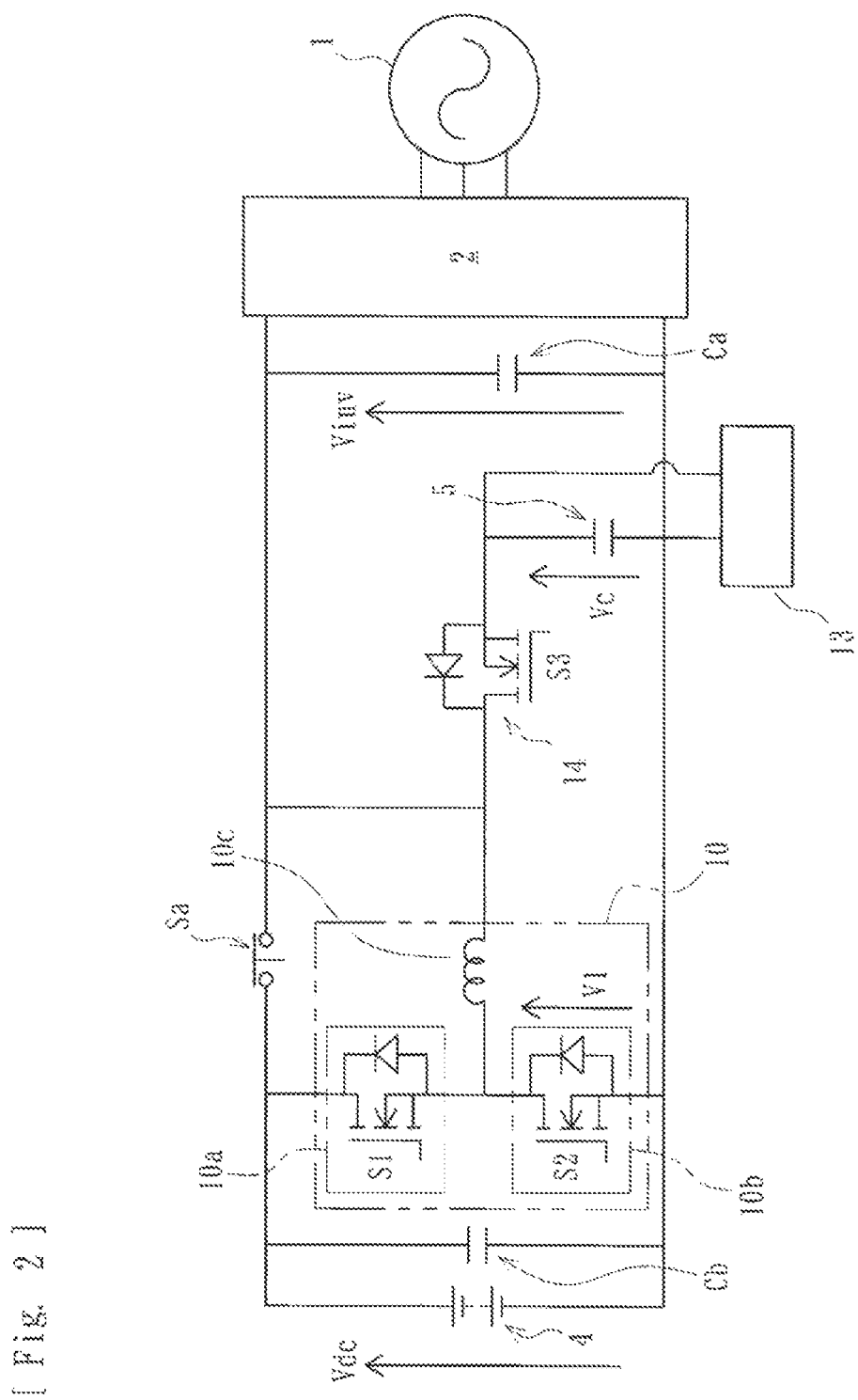
[Fig. 2]

[Fig. 3]
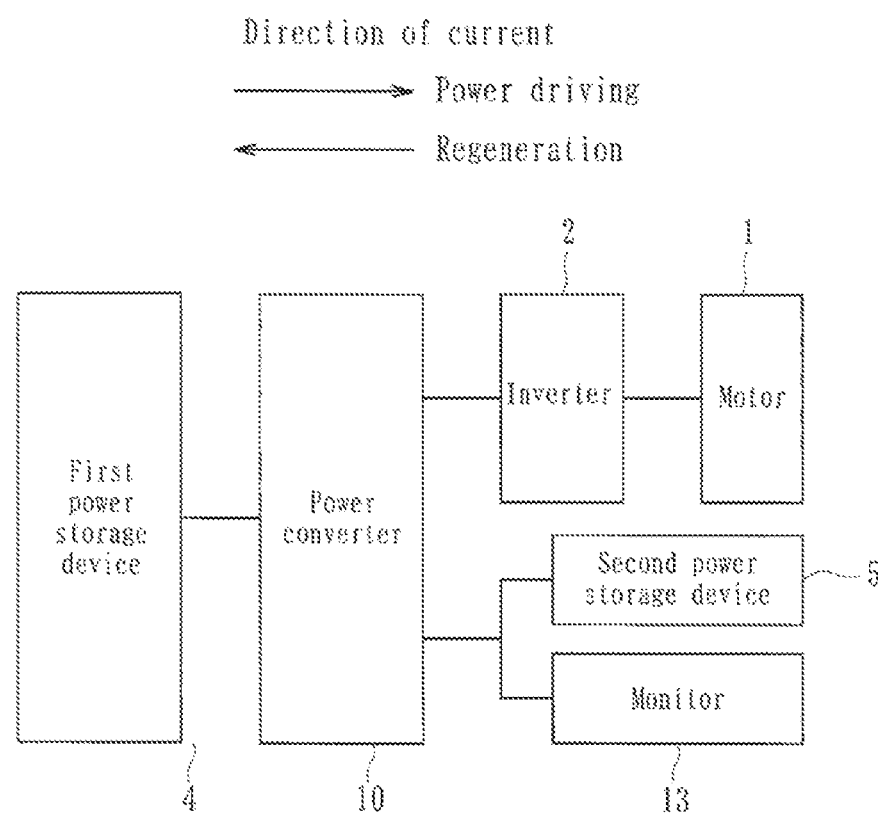

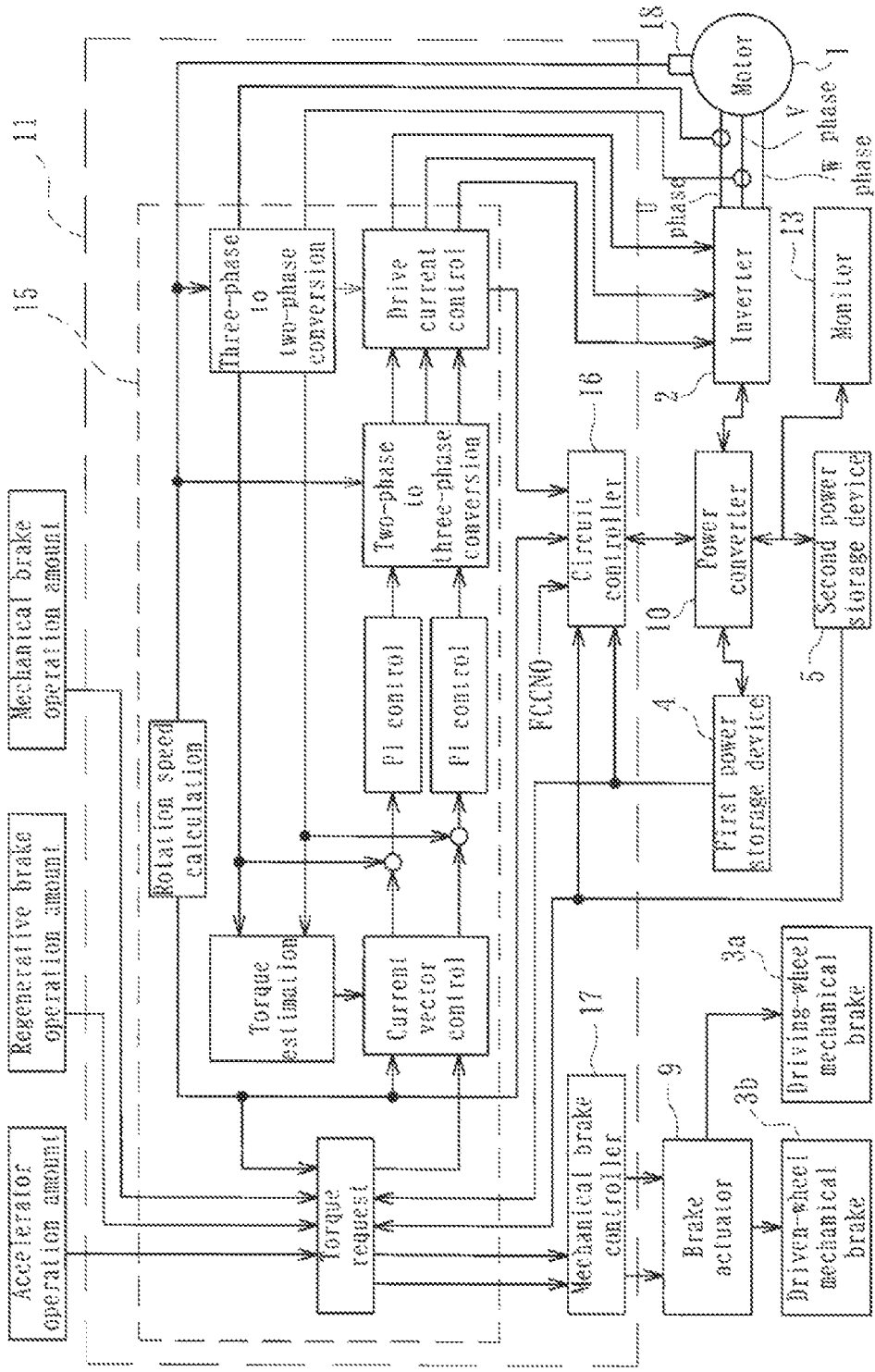
[Fig. 4]

[Fig. 5]
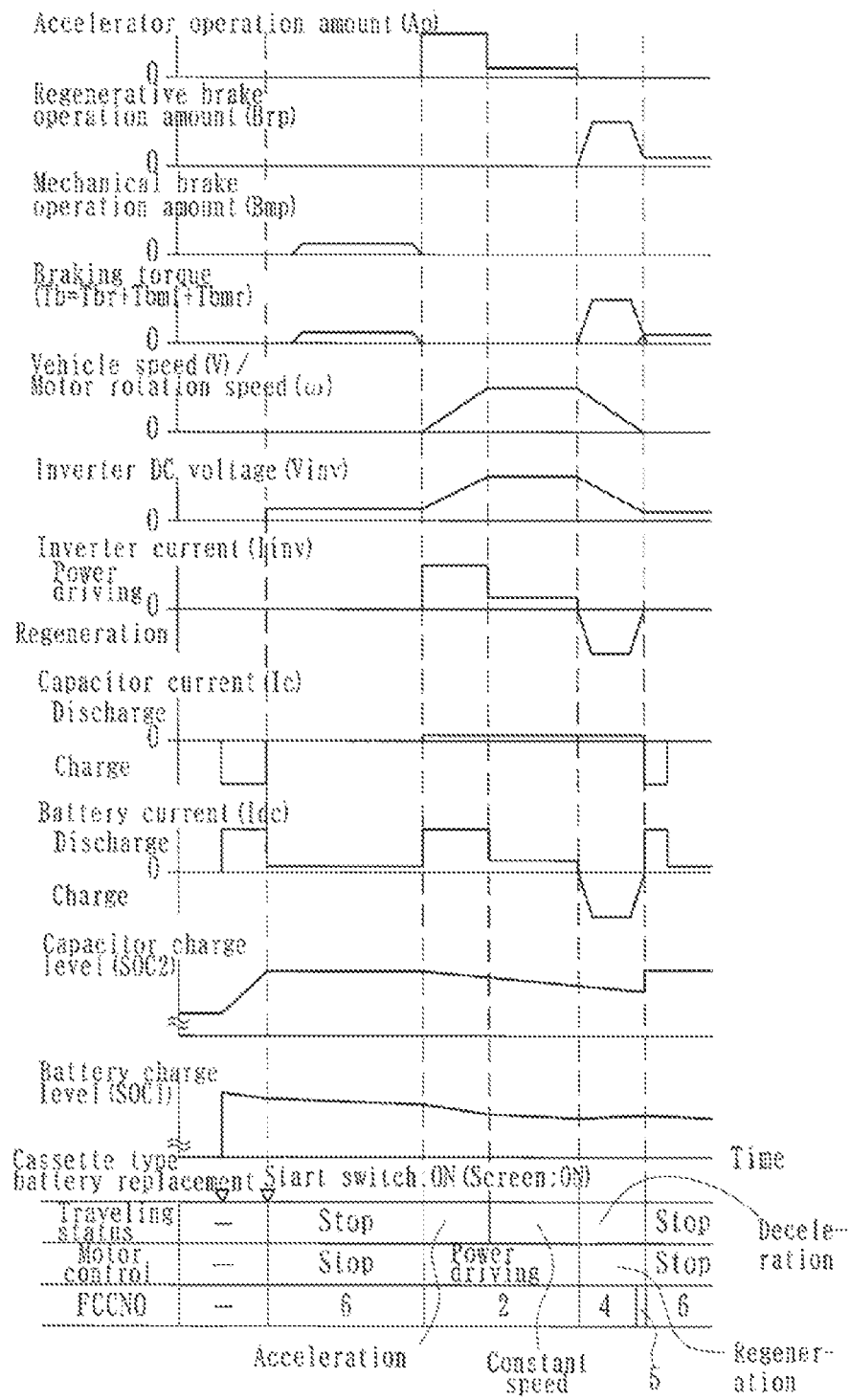

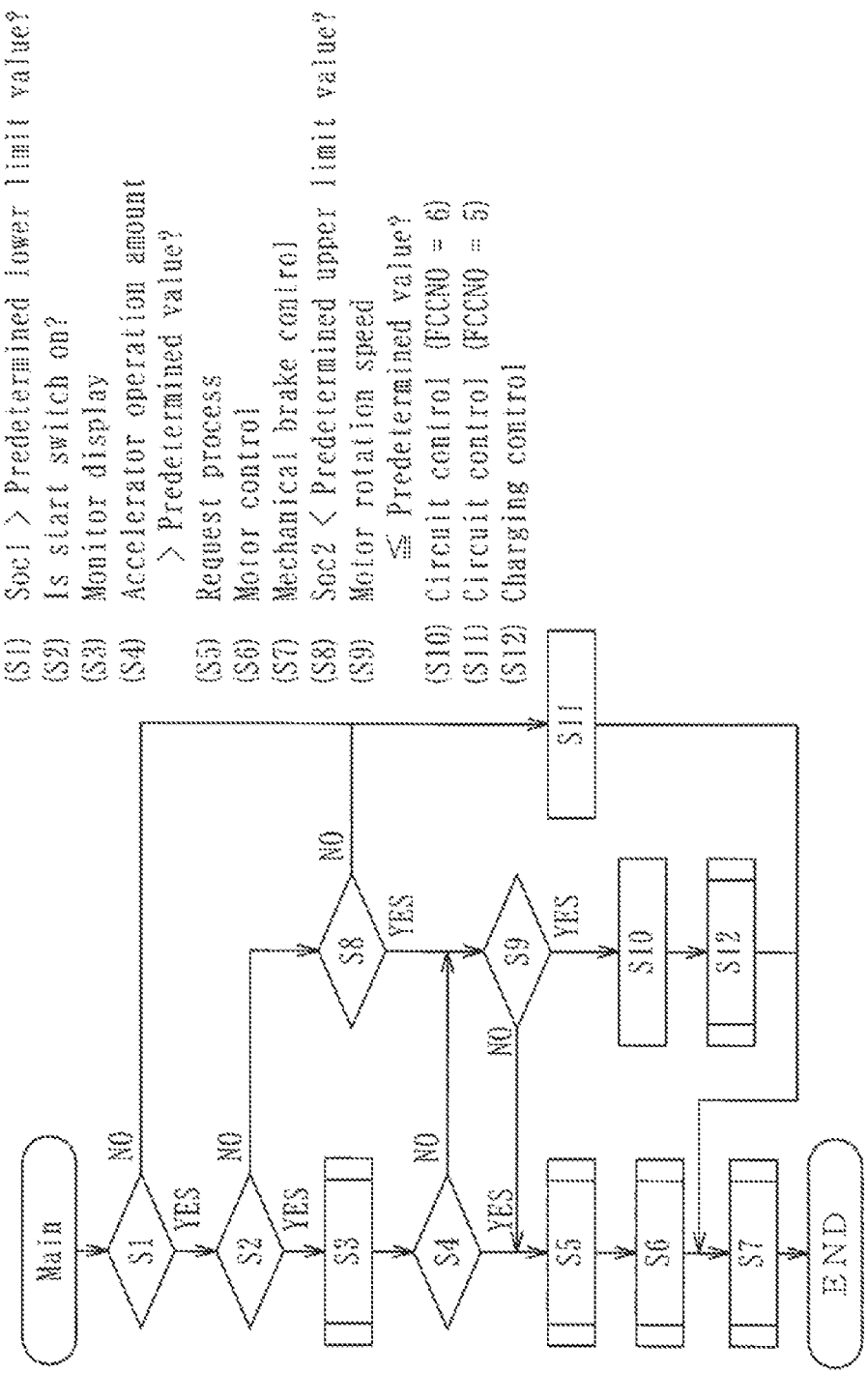

[Fig. 7]
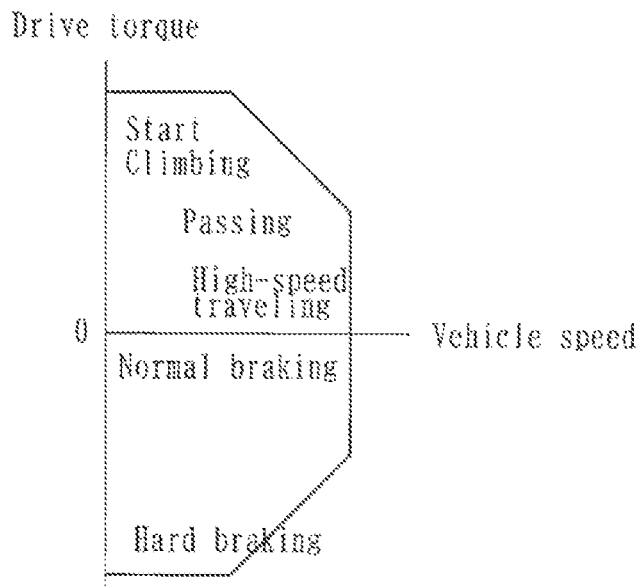
[Fig. 8]
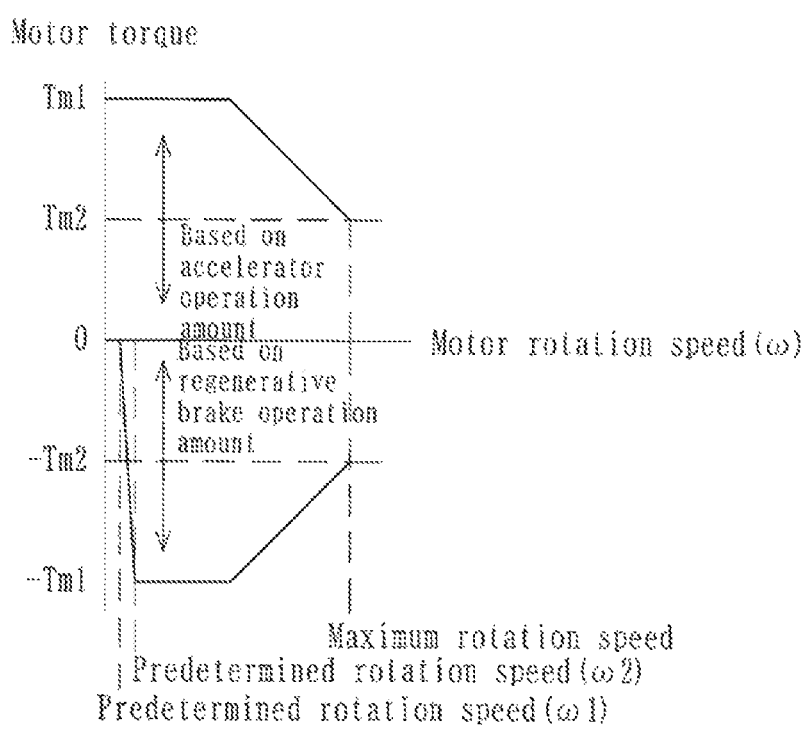

[Fig. 9]
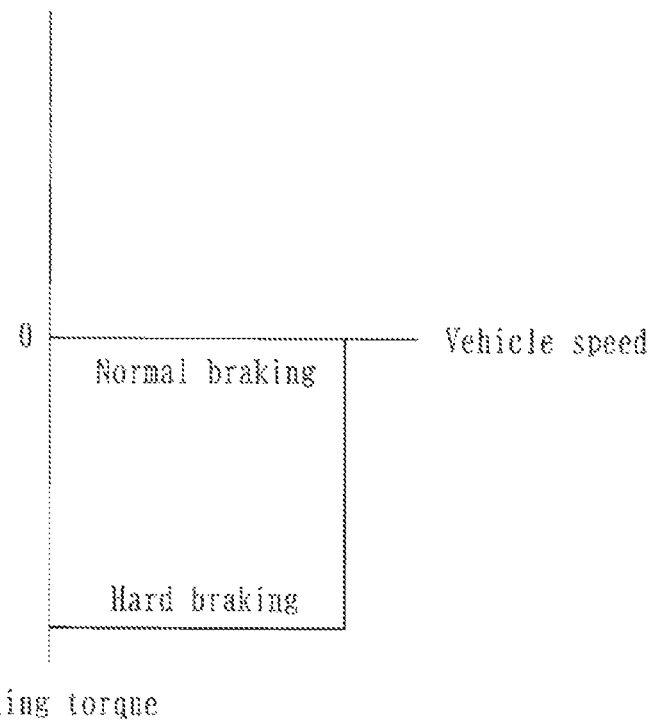
[Fig. 10]
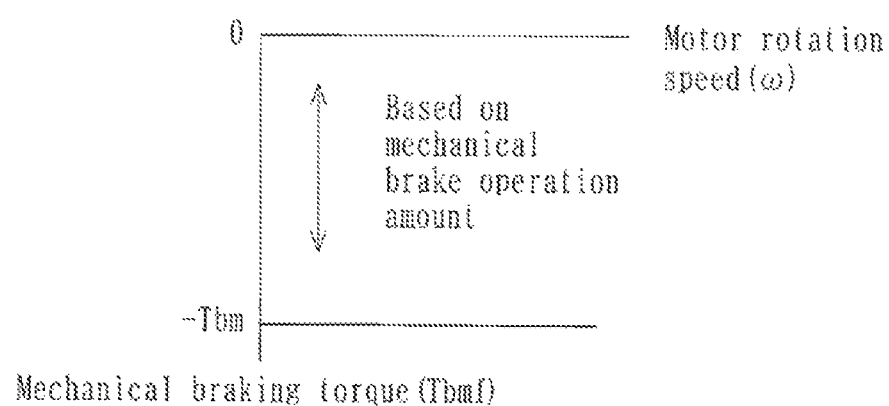

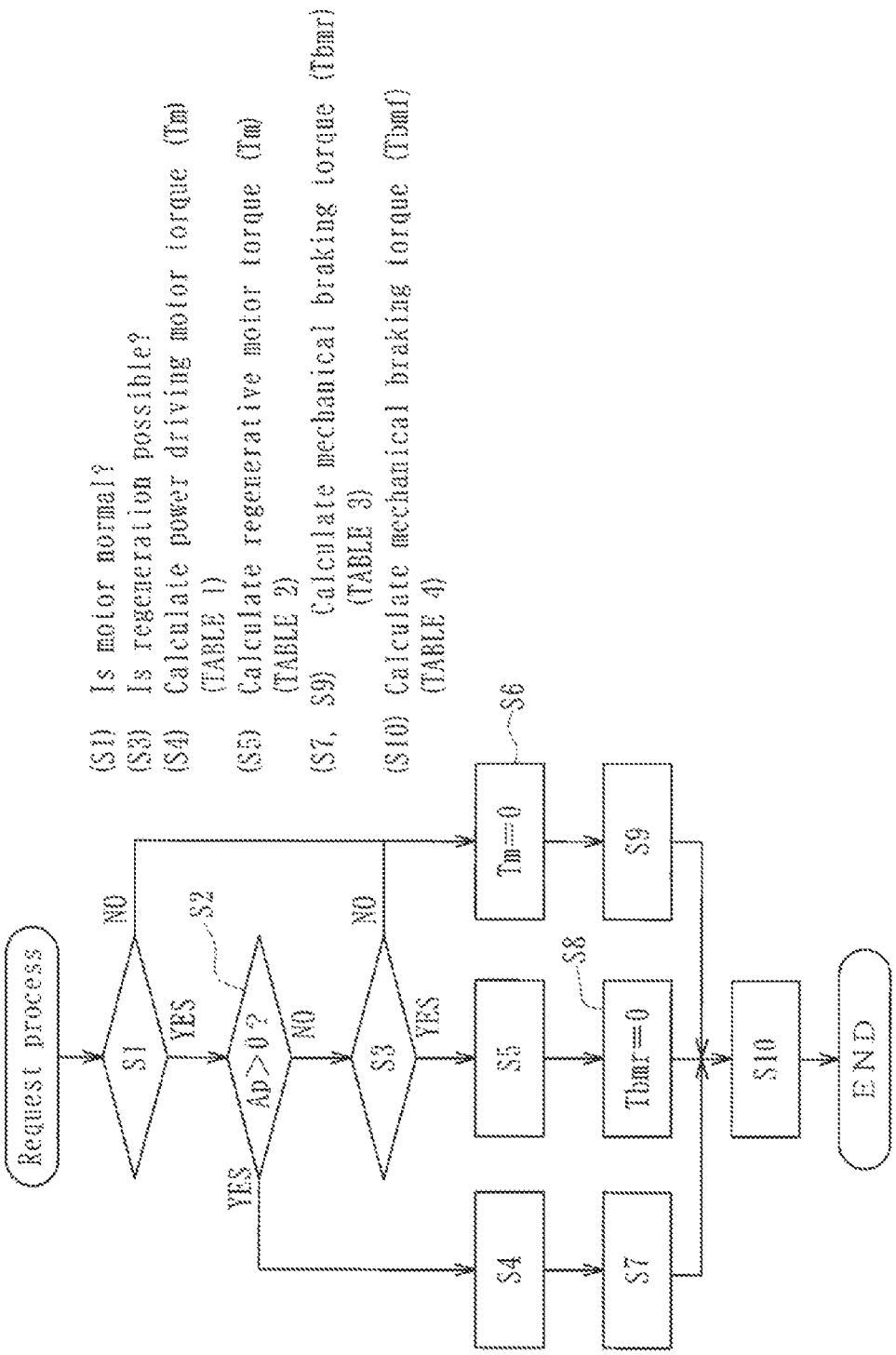

[Fig. 12]
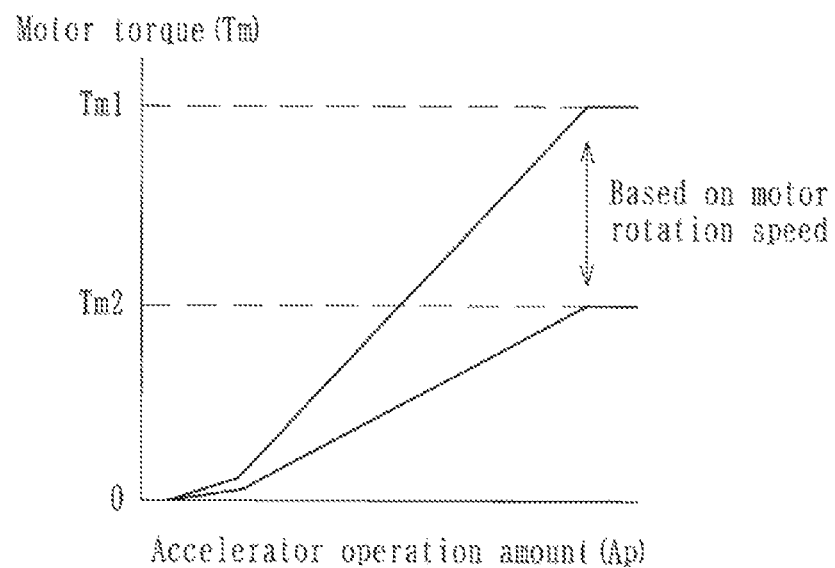
[Fig. 13]
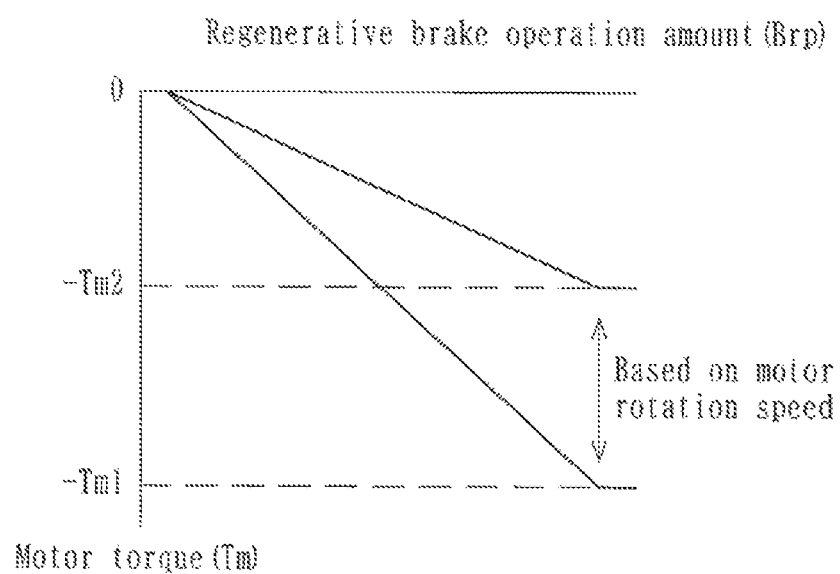

[Fig. 14]
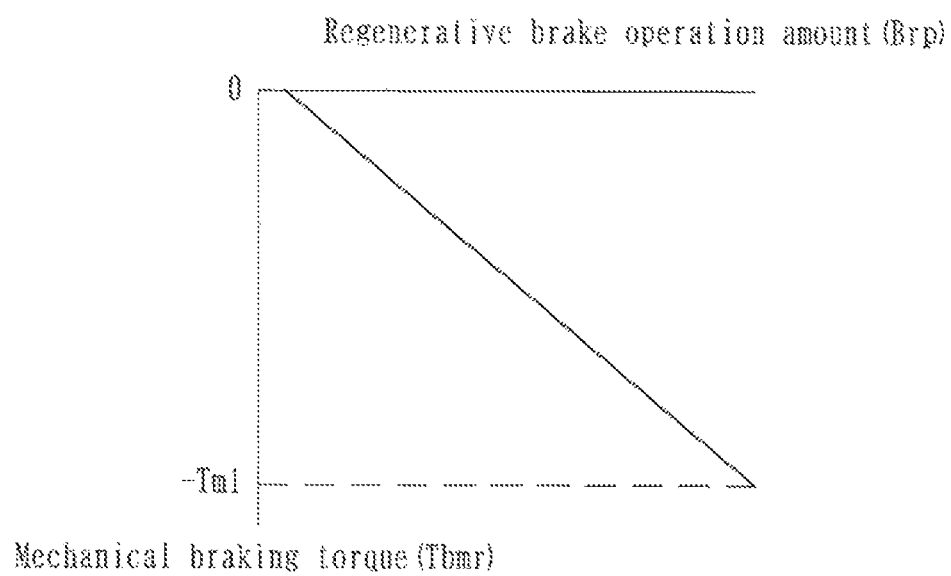
[Fig. 15]
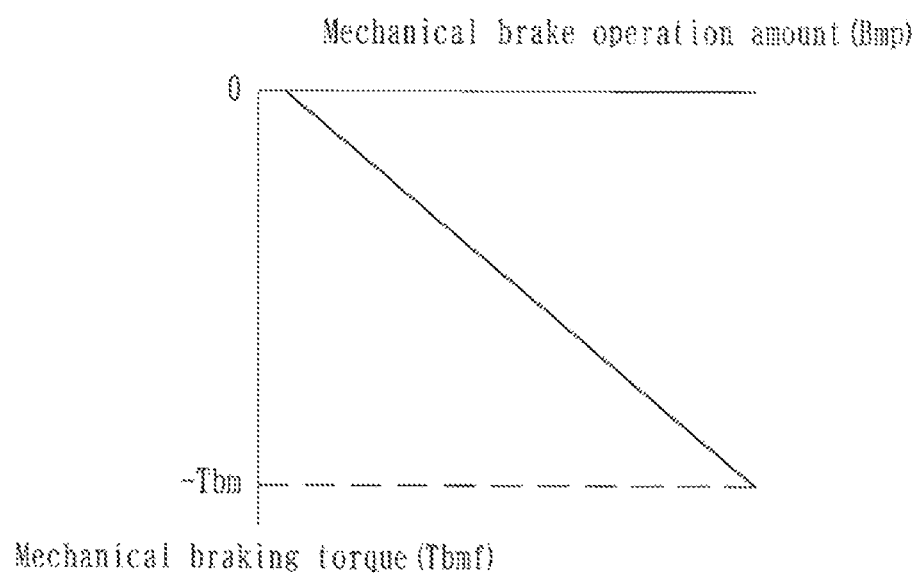

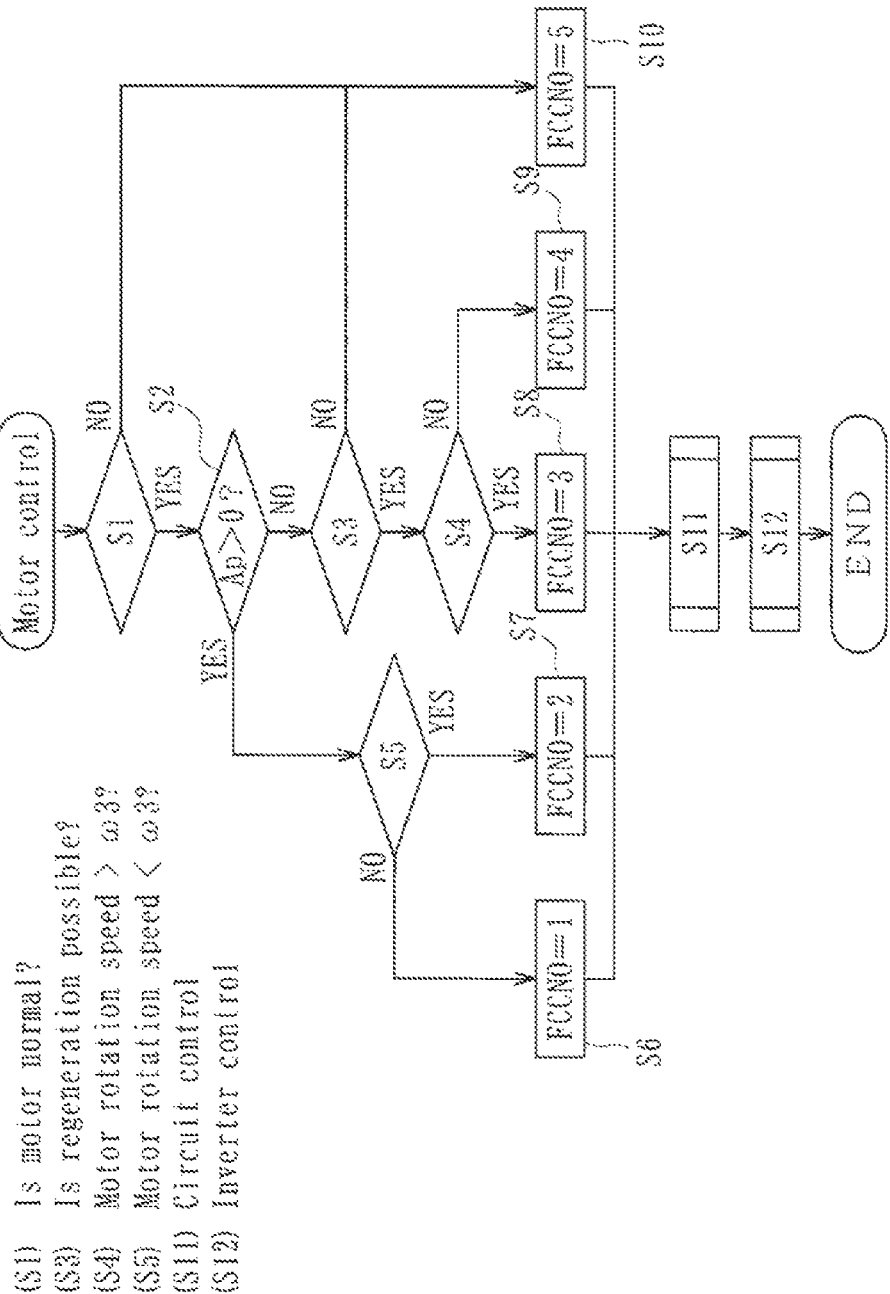

[Fig. 17]

| Motor control | FCMD | Circuit control mode | | SW | | | | Remarks |
|---|---|---|---|---|---|---|---|---|
| | | Power converter | Inverter voltage | S1 | S2 | S3 | Sa | |
| Stop | 1 | OFF | Vinv=Vdc | off | off | off | on | |
| Power driving | 2 | Step down for power driving | Vinv=Vl<Vdc | duty | duty | off | off | Vinv characteristics: Table A |
| Regeneration | 3 | OFF | Vinv=Vdc | off | off | off | on | |
| | 4 | Step up for regeneration | Vinv=Vl<Vdc | duty | duty | off | off | Vinv characteristics: Table B |
| Stop | 5 | OFF | Vinv=Vc | off | off | off | off | |
| | 6 | Step down for charging | Vinv=Vc | duty | duty | on | off | Current control |

[Fig. 18]
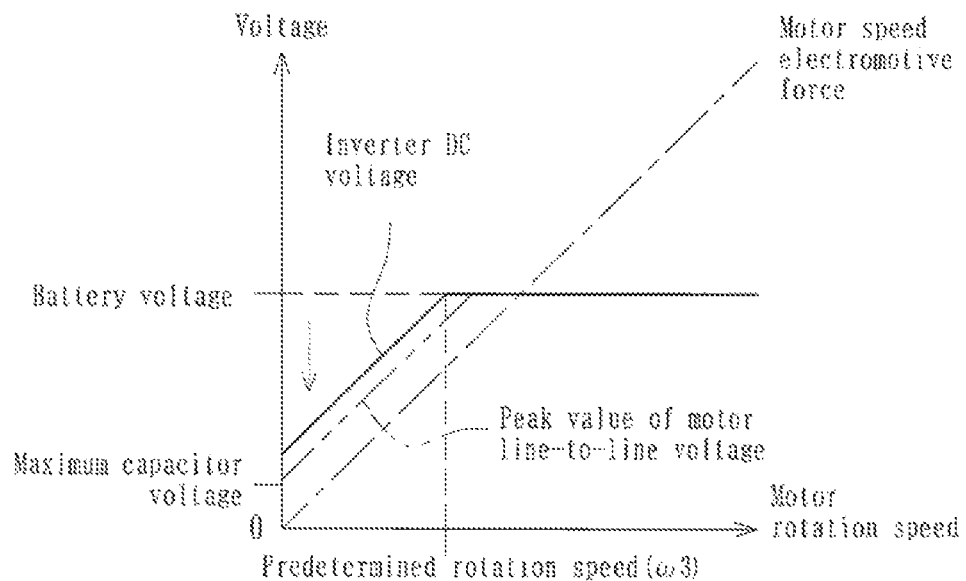
[Fig. 19]
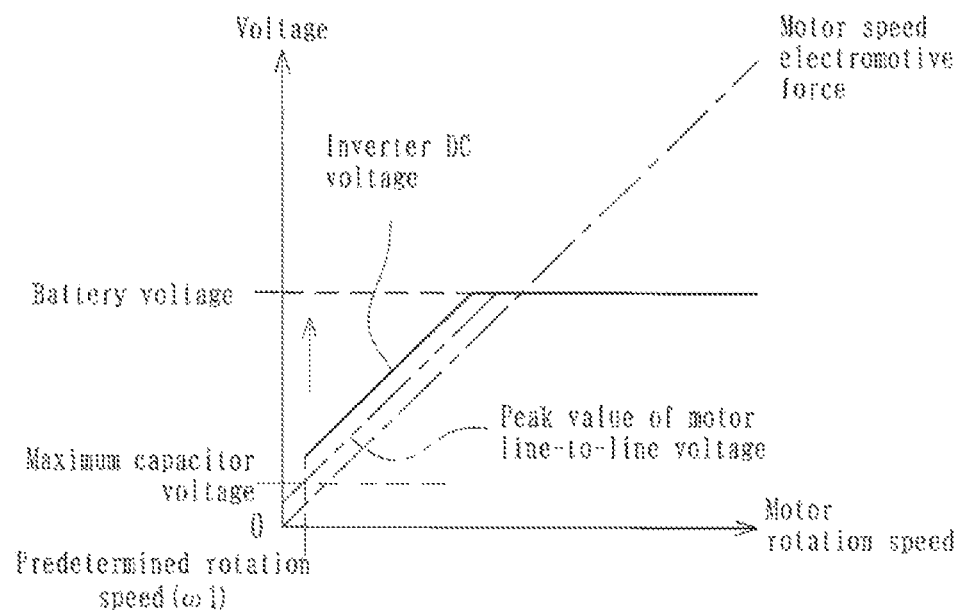

[Fig. 20]
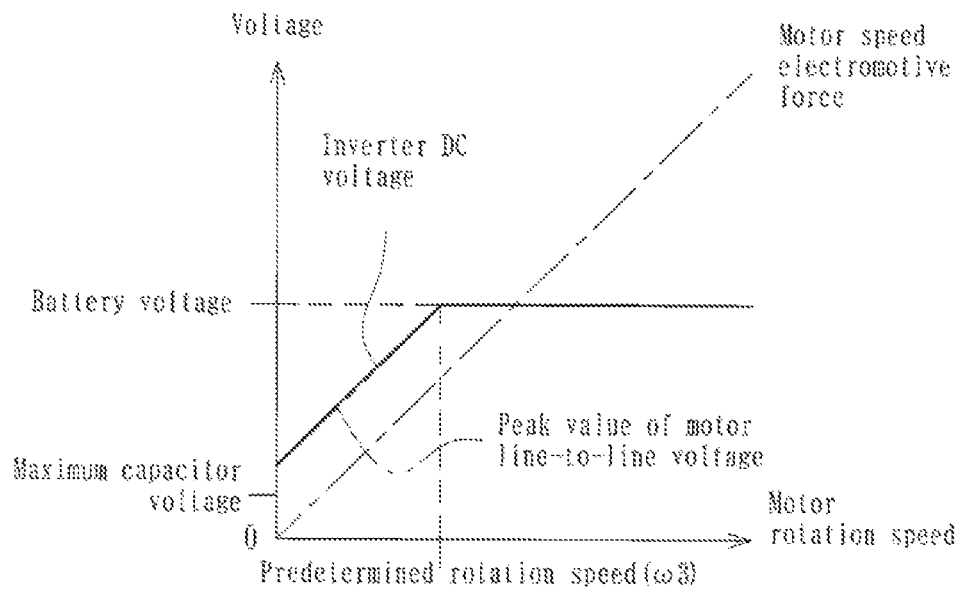
[Fig. 21]
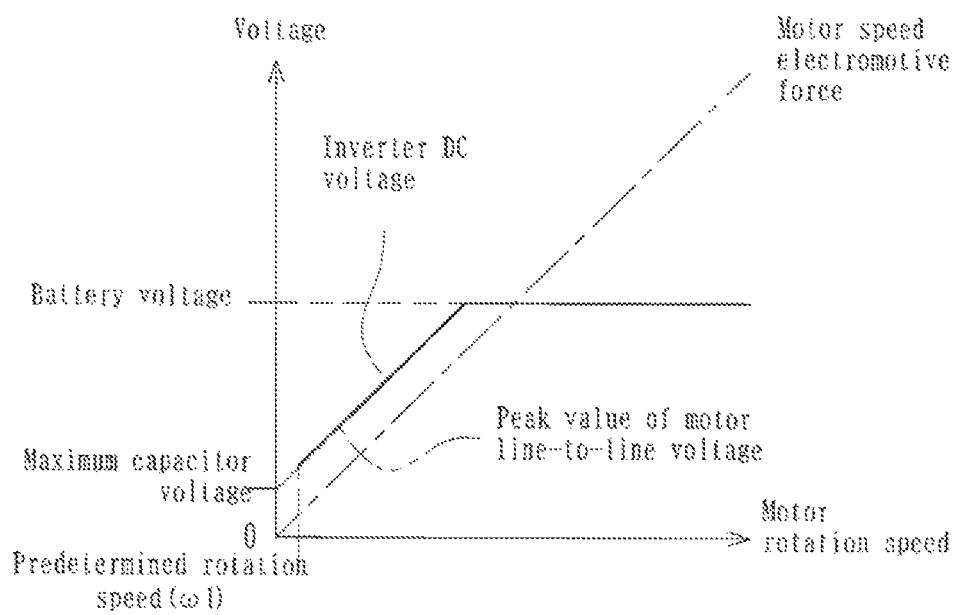

[Fig. 22]
Switching operation of the inverter circuit
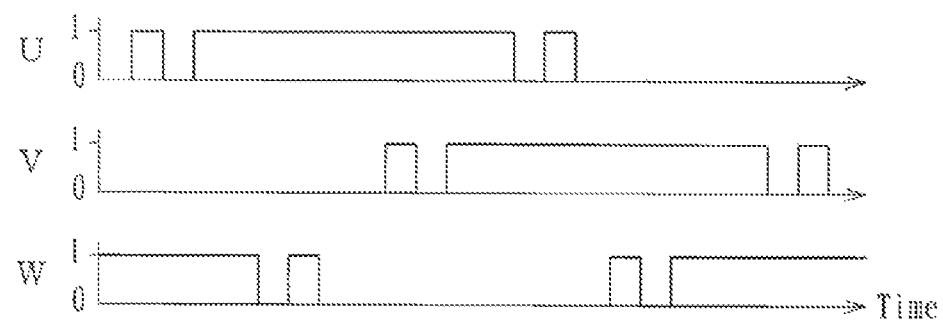
Motor line-to-line voltage
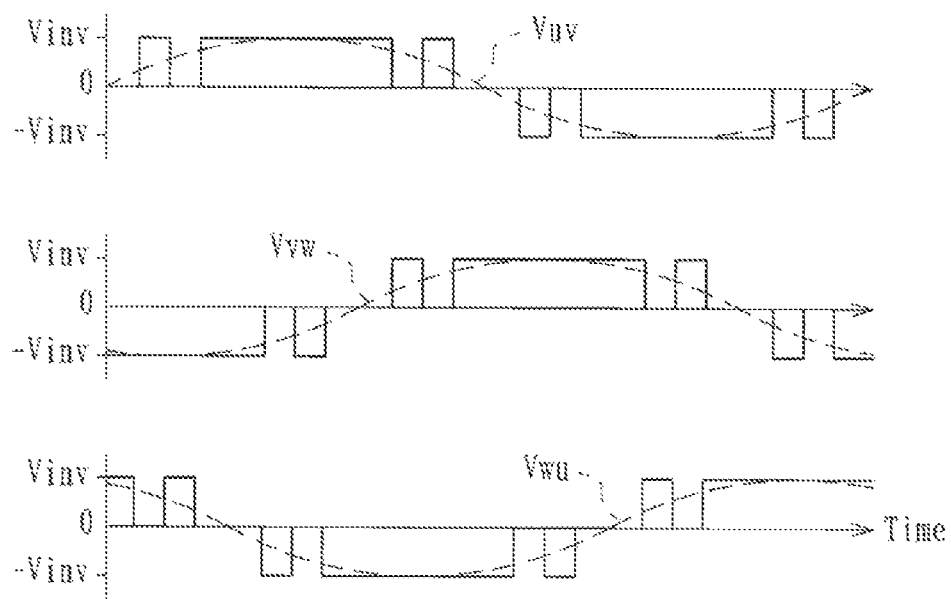
— — — Fundamental wave of motor line-to-line voltage

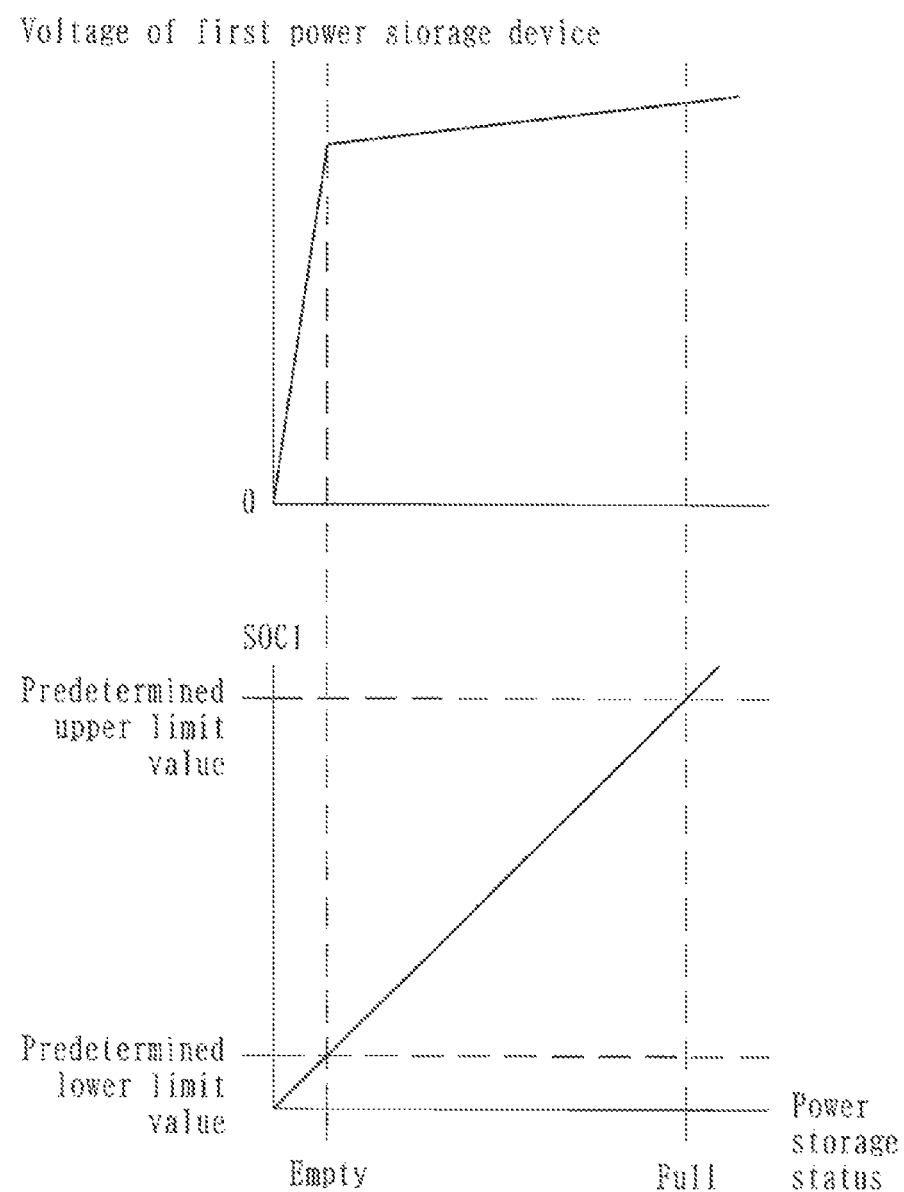
[Fig. 23]

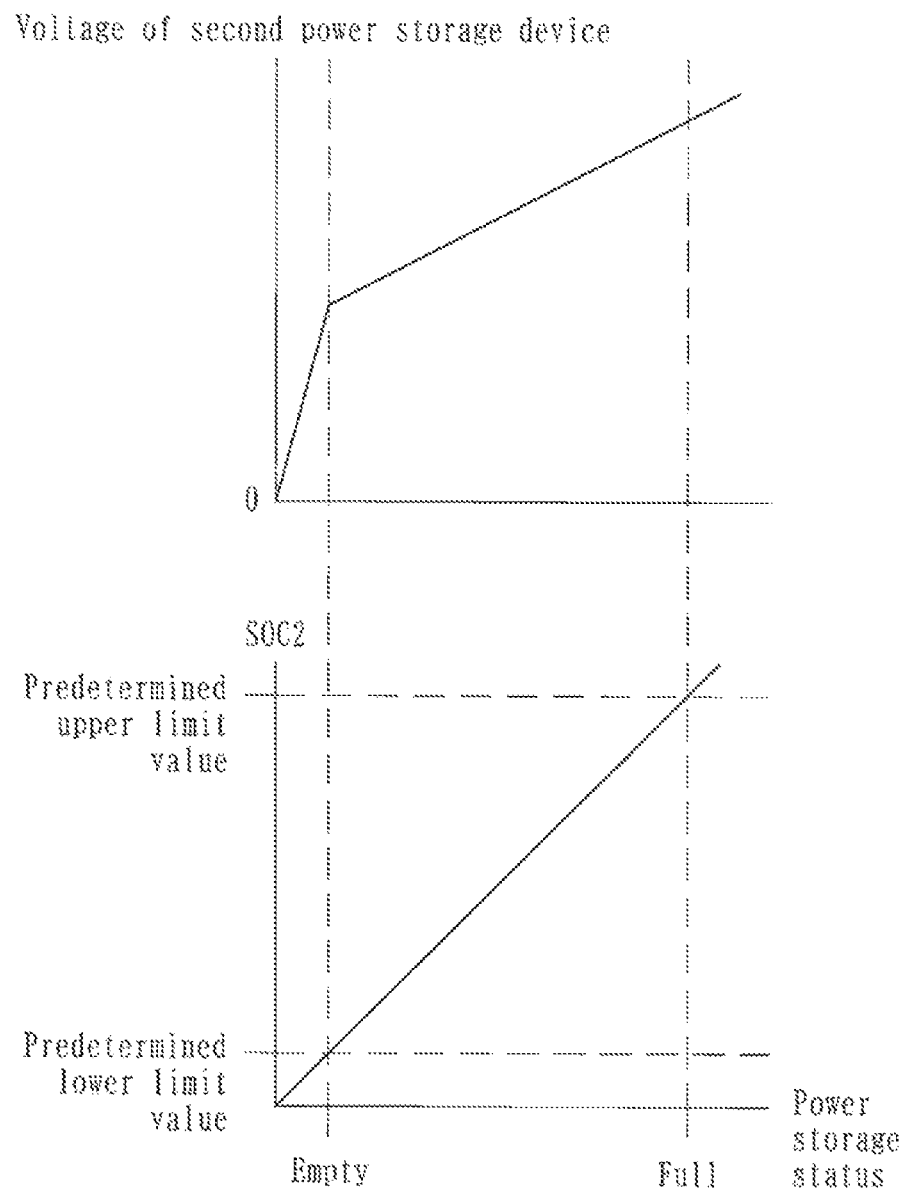
[Fig. 24]

[Fig. 25]

| Combination | Second power storage device: Low-voltage power supply | | | | | |
|---|---|---|---|---|---|---|
| | (3) Low-voltage lithium ion battery | (4) Low-voltage nickel-metal hydride battery | (5) Lithium-ion capacitor | (6) Electric double layer capacitor | (7) Lead-acid battery |
| First power storage device: High-voltage power supply | (1) High-voltage lithium ion battery | ○ | ○ | ○ | ○ | ○ |
| | (2) High-voltage nickel-metal hydride battery | ○ | ○ | ○ | ○ | ○ |

MOTOR VEHICLE

CROSS-REFERENCE TO RELATED APPLICATION

This application claims priority to Japanese Application No. 2020-194412, filed Nov. 24, 2020. The disclosure of the above application is incorporating herein by reference.

FIELD

The present disclosure relates to a motor vehicle including a motor performing power driving and, more particularly, a power storage device suppling energy to the motor in a driving mode and restore energy from motor in a regeneration mode.

BACKGROUND

A motor vehicle described in Japanese Unexamined Patent Application Publication No. 2002-84780 is an example of a motor vehicle including a motor performing power driving and regeneration. A power storage device supplies energy to the motor. The motor vehicle can obtain a thrust by a drive force of the motor, and recover the energy into the power storage device by adjusting a braking torque of a driving wheel. According to this motor vehicle, the energy recovered during braking can be stored in the power storage device (battery) and used as drive energy during the power driving. For example, Japanese Unexamined Patent Application Publication No. 2019-118241 discloses a technology for reducing a loss of an inverter at the time of low-power output by stepping down an output voltage of a power storage device when necessary electric power is smaller than a threshold.

In the related art of Japanese Unexamined Patent Application Publication No. 2019-118241, the loss of the inverter at the time of low-power output can be reduced by stepping down the output voltage of the power storage device during the power driving of the motor. However, it is necessary to add a power converter for stepping down the output voltage of the power storage device. Thus, this causes a problem in that manufacturing costs increase.

SUMMARY

According to a first aspect of the disclosure, a motor vehicle includes a motor that performs power driving and regeneration. An inverter converts a direct current into an alternating current. A power storage device supplies energy to the motor. A power converter has a voltage step down function during the power driving and a voltage step up function during the regeneration. In a circuit, the power converter, with the voltage step down function during the power driving, is connected to the power storage device. During the power driving of the motor, the power converter steps down an output voltage of the power storage device to supply the energy from the power storage device to the inverter. During the regeneration in the motor, the power converter steps up a DC voltage of the inverter to recover regenerated energy into the power storage device.

According to a second aspect of the disclosure, the power storage device may be a first power storage device with a high-voltage characteristic. The motor vehicle may further include a second power storage device with a low-voltage characteristic. Also, an auxiliary device operates by using the second power storage device as a power supply. The second power storage device and the auxiliary device may be connected to the power converter in the circuit in parallel to the inverter. During charging from the first power storage device to the second power storage device, an output voltage of the first power storage device may be stepped down to supply energy from the first power storage device to the second power storage device.

According to a third aspect of the disclosure, the first power storage device may be mountable on and removable from the motor vehicle. The motor vehicle may further include a start switch enabling the motor vehicle to travel. The energy may be supplied from the first power storage device to the second power storage device when the start switch is OFF and the second power storage device is chargeable.

According to a fourth aspect of the disclosure, the motor vehicle may further include an accelerator operator controlling the motor to adjust a drive torque of a driving wheel. A start switch enables the motor vehicle to travel. The energy may be supplied from the first power storage device to the second power storage device when the accelerator operator is not operated, the start switch is ON, and a rotation speed of the motor is equal to or lower than a predetermined rotation speed.

According to a fifth aspect of the disclosure, during the power driving of the motor, the energy may be supplied from the first power storage device to the inverter while stepping down the output voltage of the first power storage device. Thus, the output voltage of the first power storage device becomes equal to or higher than a voltage of the second power storage device.

According to a sixth aspect of the disclosure, during the regeneration in the motor, the energy may be recovered into the first power storage device while stepping up the DC voltage of the inverter at a motor rotation speed equal to or higher than a motor rotation speed where the DC voltage of the inverter becomes higher than a voltage of the second power storage device.

According to a seventh aspect of the disclosure, during current control of the inverter, the DC voltage of the inverter may be controllable based on a rotation speed of the motor. When the rotation speed of the motor is equal to or lower than a predetermined rotation speed, the DC voltage of the inverter may be controlled to decrease as the rotation speed of the motor decreases.

According to an eighth aspect of the disclosure, when a rotation speed of the motor is equal to or lower than a predetermined rotation speed, during current control of the inverter, the DC voltage of the inverter may be controlled based on a peak value of a motor line-to-line voltage.

According to a ninth aspect of the disclosure, the first power storage device may be a high-voltage lithium ion battery or a high-voltage nickel-metal hydride battery. The second power storage device may be a low-voltage lithium ion battery, a low-voltage nickel-metal hydride battery, a lithium ion capacitor, an electric double layer capacitor, or a lead-acid battery.

According to the present disclosure, during the power driving of the motor, the power converter steps down the output voltage of the power storage device to supply the energy from the power storage device to the inverter. During the regeneration in the motor, the power converter steps up the DC voltage of the inverter to recover the regenerated energy into the power storage device. Therefore, a loss of the inverter is reduced during the power driving of the motor. The energy is securely recovered into the power storage device during the regeneration in the motor. Thus, the power converter can be used effectively, and manufacturing costs can be reduced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic diagram of a motor.

FIG. 2 is a circuit diagram of a power conversion device of the motor vehicle.

FIG. 3 is a conceptual diagram of the power conversion device of the motor vehicle.

FIG. 4 is a schematic diagram of power control relationships in the motor vehicle.

FIG. 5 is a time chart of overall power control in the motor vehicle.

FIG. 6 is a flowchart of main control in the motor vehicle.

FIG. 7 is a graph of request characteristics of the motor vehicle (vehicle requests on a driving wheel).

FIG. 8 is a graph of request characteristics of the motor vehicle (motor requests on the driving wheel).

FIG. 9 is a graph of request characteristics of the motor vehicle (vehicle requests on a driven wheel).

FIG. 10 is a graph of request characteristics of the motor vehicle (brake requests on the driven wheel).

FIG. 11 is a flowchart of request process control in the motor vehicle.

FIG. 12 is a graph of a driver's request table of the motor vehicle (Table 1).

FIG. 13 is a graph of a driver's request table of the motor vehicle (Table 2).

FIG. 14 is a graph of a driver's request table of the motor vehicle (Table 3).

FIG. 15 is a graph of a driver's request table of the motor vehicle (Table 4).

FIG. 16 is a flowchart of motor control in the power control in the motor vehicle.

FIG. 17 is a table of power conversion circuit control in the motor vehicle.

FIG. 18 is a graph of a voltage request table of the motor vehicle (Table A in a case of PWM).

FIG. 19 is a graph of a voltage request table of the motor vehicle (Table B in the case of PWM).

FIG. 20 is a graph of a voltage request table of the motor vehicle (Table A in a case depending on a peak value of a motor line-to-line voltage).

FIG. 21 is a graph of a voltage request table of the motor vehicle (Table B in the case depending on the peak value of the motor line-to-line voltage).

FIG. 22 is a time chart of an example of an operation depending on a peak value of a motor line-to-line voltage in a motor vehicle according to another embodiment.

FIG. 23 is a graph of a power storage status of a first power storage device of the motor vehicle.

FIG. 24 is a graph of a power storage status of a second power storage device of the motor vehicle.

FIG. 25 is a table of combinations of power storage devices of the motor vehicle.

DETAILED DESCRIPTION

Embodiments of the present disclosure are described below in detail with reference to the drawings.

A motor vehicle according to each of the embodiments is a straddling vehicle, such as a motorcycle, traveling by using a drive force of a motor. As illustrated in FIGS. 1 to 4, the motor vehicle mainly includes a motor 1, an inverter 2, mechanical brakes (3a, 3b), a first power storage device 4, a second power storage device 5, an accelerator operator 6, a mechanical brake operator 7, a regenerative brake operator 8, a power converter 10, an ECU 11, a start switch 12, and a monitor 13. The monitor operates by using the second power storage device 5 as a power supply.

The motor 1 is an electromagnetic motor obtaining a drive force by an energy supply. As illustrated in FIGS. 2 and 3, the motor 1 is electrically connectable to the power converter 10 and the first power storage device 4, via the inverter 2. The motor performs power driving and regeneration. The inverter 2 (DC-AC inverter) converts a direct current into an alternating current. In this embodiment, the inverter 2 converts a direct current of the first power storage device 4 into an alternating current. It supplies the alternating current to the motor 1.

The mechanical brakes performs braking by releasing energy, as typified by a disc brake or a drum brake. The mechanical brakes are a driving-wheel mechanical brake 3a performing braking by releasing kinetic energy of a driving wheel Ta. A driven-wheel mechanical brake 3b performs braking by releasing kinetic energy of a driven wheel Tb. The driving-wheel mechanical brake 3a and the driven-wheel mechanical brake 3b are connected to the mechanical brake operator 7 via a brake actuator 9.

The mechanical brake operator 7 controls the mechanical brake (driven-wheel mechanical brake 3b) to adjust a braking torque. In this embodiment, an operation lever is attached to the right end of a handle bar. Based on an operation amount of the mechanical brake operator 7, a mechanical brake controller 17 (see FIG. 4) may operate the brake actuator 9 to actuate the driven-wheel mechanical brake 3b.

The accelerator operator 6 controls the motor 1 to adjust a drive torque of the driving wheel Ta. In this embodiment, an accelerator grip is attached to the right end of the handle bar. As illustrated in FIG. 4, based on an operation amount of the accelerator operator 6, an inverter controller 15 may estimate a torque request and operate the motor 1 to obtain a desired drive force. The inverter controller 15 is one controller provided in the ECU 11.

The power storage devices supply energy to the motor 1. In this embodiment, the power storage devices are the first power storage device 4, suppling energy to the motor, and the second power storage device 5. The first power storage device 4 is a power storage device with a high-voltage characteristic. As illustrated in FIG. 25, examples of the first power storage device 4 include a high-voltage lithium ion battery and a high-voltage nickel-metal hydride battery. The second power storage device 5 is a power storage device with a low-voltage characteristic. As illustrated in FIG. 25, examples of the second power storage device 5 include a low-voltage lithium ion battery, a low-voltage nickel-metal hydride battery, a lithium ion capacitor, an electric double layer capacitor, and a lead-acid battery.

The regenerative brake operator 8 controls the motor 1 to adjust a braking torque of the driving wheel Ta and recover the energy into the power storage device (first power storage device 4). In this embodiment, an operation lever is attached to the left end of the handle bar. Based on an operation amount of the regenerative brake operator 8, the motor 1 performs regeneration to obtain a desired braking force. Through the regeneration in the motor 1, the energy can be recovered into the first power storage device 4.

The power converter 10 has a voltage step down function during the power driving of the motor 1 (during energy supply to the motor 1), and a voltage step up function during the regeneration in the motor 1 (during energy recovery from the motor 1). As illustrated in FIGS. 2 and 3, the power converter 10 is connected between the first power storage device 4 and the inverter 2 in an electric circuit. More specifically, as illustrated in FIG. 2, the power converter 10 includes two semiconductor switching elements 10a and 10b and a reactor 10c (coil). The semiconductor switching elements 10a and 10b include switches S1 and S2 such as MOSFETs and their body diodes, respectively.

In the power converter 10 according to this embodiment, the switches S1 and S2 of the semiconductor switching elements 10a and 10b are subjected to high-speed switching (duty control) to step down the voltage during the power driving of the motor 1 (when a current flows rightward in FIG. 3) because the reactor 10c is located on a downstream side of the semiconductor switching elements 10a and 10b. The converter steps up the voltage during the regeneration in the motor 1 (when the current flows leftward in FIG. 3) because the reactor 10c is located on an upstream side of the semiconductor switching elements 10a and 10b.

More specifically, this embodiment provides, as illustrated in FIG. 2, a circuit where the power converter 10 is connected to the power storage device (first power storage device 4) and the inverter 2 is connected to the reactor of the power converter 10. During the power driving of the motor 1, the power converter 10 steps down an output voltage (Vdc) of the first power storage device 4 to supply energy from the power storage device (first power storage device 4) to the inverter 2. During the regeneration in the motor 1, the power converter 10 steps up a DC voltage (Vinv) of the inverter 2 to recover regenerated energy into the power storage device (first power storage device 4).

In this embodiment, as illustrated in FIG. 2, the second power storage device 5 and the monitor 13 (auxiliary device) are connected to the power converter 10 in the circuit in parallel to the inverter 2. During charging from the first power storage device 4 to the second power storage device 5, the output voltage of the first power storage device 4 is stepped down to supply energy from the first power storage device 4 to the second power storage device 5. A semiconductor switching element 14 is connected in series between the power converter 10 and the second power storage device 5. Similarly to the semiconductor switching elements 10a and 10b, the semiconductor switching element 14 includes a switch S3 that is a MOSFET, and a body diode. The circuit of this embodiment includes a switch Sa to be turned ON when the power converter 10 is OFF, and stabilization capacitors Ca and Cb are connected to the circuit.

The ECU 11 controls the motor 1 in response to input driver's requests. As illustrated in FIG. 4, the ECU 11 includes the inverter controller 15, a circuit controller 16, and the mechanical brake controller 17, and is connected to the inverter 2, the power converter 10, the first power storage device 4, the second power storage device 5, the monitor 13 (auxiliary device), and the brake actuator 9. The ECU 11 detects voltages of the first power storage device 4 and the second power storage device 5, and make determination on power storage statuses of the first power storage device 4 and the second power storage device 5 based on the voltages. FIG. 23 illustrates the power storage status of the first power storage device 4. FIG. 24 illustrates the power storage status of the second power storage device 5.

In this embodiment, during the power driving of the motor 1, the energy is supplied from the first power storage device 4 to the inverter 2 while stepping down the output voltage (Vdc) of the first power storage device 4. Thus, the output voltage of the first power storage device 4 becomes equal to or higher than a voltage (Vc) of the second power storage device 5. During the regeneration in the motor 1, the energy is recovered into the first power storage device 4 while stepping up the voltage of the inverter 2 at a motor rotation speed equal to or higher than a motor rotation speed at which the DC voltage (Vinv) of the inverter 2 becomes higher than the voltage (Vc) of the second power storage device 5.

The start switch 12 is an operation switch that enables the vehicle to travel. By operating the accelerator operator 6 after the start switch 12 is operated, the motor 1 may be actuated for traveling. The monitor 13 is an auxiliary device such as a liquid crystal monitor attached to the vehicle, and is configured to operate by using the second power storage device 5 as a power supply as described above. For example, the monitor 13 may display conditions of the vehicle (speed, power storage status, or whether malfunction has occurred) or a map of a navigation system.

The first power storage device 4 according to this embodiment is a storage battery mountable on and removable from the vehicle. The first power storage device 4 charges the second power storage device 5 when the start switch 12 is OFF. The first power storage device 4 may charge the second power storage device 5 when the start switch 12 is ON, the accelerator operator 6 is not operated, and the rotation speed of the motor 1 is equal to or lower than a predetermined rotation speed.

As illustrated in FIG. 4, this embodiment provides a detector 18, a sensor, detect the rotation speed of the motor 1. When the rotation speed of the motor 1, detected by the detector 18, is equal to or higher than a predetermined value, a predetermined braking torque, based on an operation amount of the regenerative brake operator 8, is generated by regenerative braking (particularly in this embodiment, generated only by the regenerative braking). The maximum value of the predetermined braking torque during the regeneration in the motor 1 is a rated torque of the motor 1.

When the rotation speed of the motor 1, detected by the detector 18, is lower than the predetermined value, a braking torque is generated by the mechanical brake (driving-wheel mechanical brake 3a) based on the operation amount of the regenerative brake operator 8. When the charge level of the first power storage device 4 is equal to or higher than a predetermined value, a braking torque is generated by the mechanical brake (driving-wheel mechanical brake 3a) based on the operation amount of the regenerative brake operator 8.

According to the embodiment, FIG. 5 illustrates changes in parameters in a case where the accelerator operator 6 and the regenerative brake operator 8 are operated after the start switch 12 is turned ON in the motor vehicle. In particular, a capacitor current (Ic) and a capacitor charge level (SOC2) are a current and a charge level of the second power storage device 5 of this embodiment. A battery current (Idc) and a battery charge level (SOC1) are a current and a charge level of the first power storage device 4 of this embodiment. In a table in FIG. 5, "function circuit control number" (FCCNO) corresponds to "FCCNO" in FIGS. 4, 16, and 17.

Next, according to this embodiment, control on the motor vehicle (main control) is described with reference to a flowchart of FIG. 6.

In S1, determination is first made as to whether a charge status (Soc1) of the first power storage device 4 is higher than a predetermined lower limit value (see FIG. 23). When a determination is made that the charge status (Soc1) is higher than the predetermined lower limit value, a determination is made in S2 as to whether the start switch 12 is ON. When a determination is made that the start switch 12 is ON, the monitor 13 operates in S3 to display predetermined information or the like.

In S4, determination is made as to whether an accelerator operation amount is larger than a predetermined value. When determination is made that the accelerator operation amount is larger than the predetermined value, a request process (S5), motor control (S6), and mechanical brake control (S7) are performed sequentially. When determination is made in S2 that the start switch 12 is not ON, determination is made in S8 as to whether a charge status (Soc2) of the second power storage device 5 is lower than a predetermined upper limit value (see FIG. 24). When determination is made that the charge status (Soc2) is lower than the predetermined upper limit value or when determination is made in S4 that the accelerator operation amount is not larger than the predetermined value, determination is made in S9 as to whether the motor rotation speed is equal to or lower than a predetermined value. When determination is made that the motor rotation speed is equal to or lower than the predetermined value, FCCNO is set to 6 in S10, and then charging control (S12) and the mechanical brake control (S7) are performed sequentially.

When determination is made in S9 that the motor rotation speed is not equal to or lower than the predetermined value, the request process (S5), the motor control (S6), and the mechanical brake control (S7) are performed sequentially as described above. When determination is made in S1 that the charge status (Soc1) is not higher than the predetermined lower limit value or when determination is made in S8 that the charge status (Soc2) is not lower than the predetermined upper limit value, FCCNO is set to 5 in S11, and then the mechanical brake control (S7) is performed.

Next, according to this embodiment, request characteristics of the motor vehicle are described with reference to FIGS. 7 to 10.

The characteristics illustrated in FIG. 7 show the relationship between a vehicle speed and both of the drive torque and the braking torque of the driving wheel Ta. The characteristics illustrated in FIG. 8 show the relationship between a motor torque of the driving wheel Ta and a rotation speed (w) of the motor 1. Particularly in a case of high-speed traveling, FIG. 7 illustrates relationships where the drive torque and the braking torque gradually decrease relative to the vehicle speed. In FIG. 8, a positive side, (upper half) from the vertical axis, shows a drive torque based on an operation amount of the accelerator operator 6. A negative side, (lower half) from the vertical axis, shows a braking torque based on an operation amount of the regenerative brake operator 8. In FIG. 8, reference symbol Tm1 represents the rated torque of the motor 1.

The characteristics illustrated in FIG. 9 show the relationship between the vehicle speed and a braking torque of the driven wheel Tb. The characteristics illustrated in FIG. 10 show the relationship between a braking torque of the driven wheel Tb (mechanical braking torque (Tbmf)) and the rotation speed ($\omega$) of the motor 1. Since FIGS. 9 and 10 illustrate the characteristics of the driven wheel Tb, only a negative side, (lower half) from the vertical axis, shows the characteristics (braking torques).

Next, according to this embodiment, control on the motor vehicle (request process control) is described with reference to a flowchart of FIG. 11.

In S1, determination is first made as to whether the motor 1 is normal based on whether a malfunction signal is generated. When determination is made that the motor 1 is normal, because the malfunction signal is not generated, determination is made in S2 as to whether the accelerator operator 6 is operated (whether an accelerator operation amount Ap is larger than 0). When determination is made that the accelerator operator 6 is operated, the process proceeds to S4. A motor torque (Tm), based on the operation amount of the accelerator operator 6, is calculated with reference to Table 1 illustrated in FIG. 12.

After the calculation in S4, a mechanical braking torque (Tbmr), based on an operation amount of the regenerative brake operator 8, is calculated in S7 with reference to Table 3 illustrated in FIG. 14. A mechanical braking torque (Tbmf), based on an operation amount of the mechanical brake operator 7, is calculated in S10 with reference to Table 4 illustrated in FIG. 15. When determination is made in S2 that the accelerator operator is not operated, determination is made in S3 as to whether the regeneration in the motor 1 is possible. In S3, determination is made that the regeneration in the motor 1 is possible when the power storage status (Soc1) of the first power storage device 4 is equal to or lower than a predetermined upper limit value (see FIG. 23) and the rotation speed of the motor is equal to or higher than $\omega 1$ (see FIG. 8).

When determination is made in S3 that the regeneration in the motor 1 is possible, the process proceeds to S5. A motor torque (Tm), based on the operation amount of the regenerative brake operator 8, is calculated with reference to Table 2 illustrated in FIG. 13. In the calculation of the motor torque (Tm), with reference to Table 2, when the rotation speed of the motor 1 is equal to or lower than a predetermined rotation speed ($\omega 2$) illustrated in FIG. 8, a correction is made such that $Tm=Tm(\omega-\omega 1)/(\omega 2-\omega 1)$. After the calculation in S5, the mechanical braking torque (Tbmr) is set to 0 in S8, and then S10 is performed as described above.

When determination is made in S1 that the malfunction signal is generated or when determination is made in S3 that the regeneration in the motor 1 is not possible, the process proceeds to S6, and the motor torque (Tm) is set to 0. Then, the process proceeds to S9. A mechanical braking torque (Tbmr), based on the operation amount of the regenerative brake operator 8, is calculated with reference to Table 3 illustrated in FIG. 14. This occurs the calculation in S9, S10 is performed as described above.

Next, according to this embodiment, control on the motor vehicle (motor control) is described with reference to a flowchart of FIG. 16.

In S1, determination is first made as to whether the motor 1 is normal based on whether the malfunction signal is generated. When determination is made that the motor 1 is normal because the malfunction signal is not generated, determination is made in S2 as to whether the accelerator operator 6 is operated (whether the accelerator operation amount Ap is larger than 0). When determination is made in S2 that the accelerator operator 6 is operated, determination is made in S5 as to whether the rotation speed ($\omega$) of the motor 1 is lower than $\omega 3$ (see FIGS. 18 and 20). When determination is made that the rotation speed ($\omega$) of the motor 1 is not lower than ω3 (high-speed rotation), the process proceeds to S6, and the function circuit control number (FCCNO) is set to 1.

When determination is made in S5 that the rotation speed (ω) of the motor 1 is lower than ω3 (low-speed rotation), the process proceeds to S7, and FCCNO is set to 2. When determination is made in S2 that the accelerator operator 6 is not operated, determination is made in S3 as to whether the regeneration in the motor 1 is possible. In S3, determination is made that the regeneration in the motor 1 is possible when the power storage status (Soc1) of the first power storage device 4 is equal to or lower than the predetermined upper limit value (see FIG. 23) and the rotation speed of the motor 1 is equal to or higher than ω1 (see FIG. 8).

When determination is made in S3 that the regeneration in the motor 1 is possible, the process proceeds to S4. A determination is made as to whether the rotation speed (ω) of the motor 1 is higher than ω3 (see FIGS. 18 and 20). When determination is made that the rotation speed (ω) of the motor 1 is higher than ω3 (high-speed rotation), the process proceeds to S8, and FCCNO is set to 3. When determination is made in S4 that the rotation speed (ω) of the motor 1 is not higher than ω3 (low-speed rotation), the process proceeds to S9, and FCCNO is set to 4. When determination is made in S1 that the motor 1 malfunctions because the malfunction signal is generated or when determination is made in S3 that the regeneration in the motor 1 is not possible, the process proceeds to S10, and FCCNO is set to 5. After any one of FCCNOs 1 to 5 is determined as described above, the process proceeds to S11. Control is performed in accordance with FCCNO, and then inverter control is performed in S12.

The control in accordance with FCCNO in S11 is performed with reference to a control table of FIG. 17. The following are details of the control in the control table.

When FCCNO=1 or 3, the switches S1 and S2 of the semiconductor switching elements 10a and 10b are turned OFF (the power converter 10 is turned OFF), the switch S3 is turned OFF, and the switch Sa is turned ON.

When FCCNO=2, the switches S1 and S2 of the semiconductor switching elements 10a and 10b are subjected to duty control during the power driving. Thus, the power converter 10 steps down the output voltage of the first power storage device. Further, the switch S3 and the switch Sa are turned OFF. When FCCNO=2, current control of the inverter 2 is performed with reference to Table A illustrated in FIG. 18.

According to Table A, when the current control of the inverter 2 is performed under PWM control, the DC voltage of the inverter 2 is controllable based on the rotation speed (ω) of the motor 1 as illustrated in FIG. 18. When the rotation speed of the motor 1 is equal to or lower than the predetermined rotation speed (ω3), the DC voltage of the inverter 2 is controlled to decrease as the rotation speed of the motor 1 decreases. Also in Table B described later, it is assumed that the current control of the inverter 2 is performed under the PWM control.

When FCCNO=4, the switches S1 and S2 of the semiconductor switching elements 10a and 10b are subjected to duty control during the regeneration. Thus, the power converter 10 steps up the inverter DC voltage. Further, the switch S3 and the switch Sa are turned OFF. When FCCNO=4, the current control of the inverter 2 is performed with reference to Table B illustrated in FIG. 19.

When FCCNO=5, the switches S1 and S2 of the semiconductor switching elements 10a and 10b and the switches S3 and Sa are turned OFF. When FCCNO=6, the switches S1 and S2 of the semiconductor switching elements 10a and 10b are subjected to duty control during the charging. Thus, the power converter 10 steps down the output voltage of the first power storage device. Further, the switch S3 is turned ON, and the switch Sa is turned OFF.

In the embodiment described above, Tables A and B are applied on the premise that the current control of the inverter 2 is performed under the pulse width modulation (PWM) control. Instead, the current control of the inverter 2 may depend on a peak value of a motor line-to-line voltage considering Pulse Amplitude Modulation (PAM) technique. That is, the PWM control is control for changing a width of a switching frequency (pulse width) (changing a current flow rate of the inverter) relative to the predetermined inverter DC voltage. However, the control depending on the peak value of the motor line-to-line voltage is control for changing the DC voltage of the inverter depending on the peak value of the motor line-to-line voltage as illustrated in FIGS. 20 to 22.

In the case where the current control of the inverter 2 is performed under the control depending on the peak value of the motor line-to-line voltage, in Table A illustrated in FIG. 20, the DC voltage of the inverter 2 is controlled based on the peak value of the motor line-to-line voltage when the rotation speed of the motor 1 is equal to or lower than the predetermined rotation speed (ω3). In Table B, control is performed as illustrated in FIG. 21. FIG. 22 is a time chart illustrating an example of a switching operation of the inverter circuit and behavior of the motor line-to-line voltage and a fundamental wave of the motor line-to-line voltage in a case where the current is controlled with reference to either one of the tables in FIGS. 20 and 21 (the inverter DC voltage is equal to the peak value of the motor line-to-line voltage). In this time chart, the inverter DC voltage (Vinv) agrees with a peak value of the fundamental wave of the motor line-to-line voltage.

In the motor vehicle according to the embodiment described above, during the power driving of the motor 1, the power converter 10 steps down the output voltage of the power storage device (first power storage device 4) to supply the energy from the first power storage device 4 to the inverter 2. During the regeneration in the motor 1, the power converter 10 steps up the DC voltage of the inverter 2 to recover the regenerated energy into the power storage device (first power storage device 4). Therefore, a loss of the inverter 2 is reduced during the power driving of the motor 1. The energy is securely recovered into the power storage device (first power storage device 4) during the regeneration in the motor 1. Thus, the power converter 10 can be used effectively.

The second power storage device 5 and the monitor 13 (auxiliary device) are connected to the power converter 10 in the circuit in parallel to the inverter 2. During charging from the first power storage device 4 to the second power storage device 5, the output voltage of the first power storage device 4 is stepped down to supply the energy from the first power storage device 4 to the second power storage device 5. Therefore, the step-down circuit can be shared between the case of power driving and the case of charging the second power storage device 5.

The first power storage device 4, according to this embodiment, is mountable on and removable from the vehicle. The start switch 12 is provided to enables the vehicle to travel. The first power storage device 4 charges the second power storage device 5 when the start switch 12 is OFF. Therefore, the second power storage device 5 is charged before the driver drives the vehicle. For example, when the remaining power storage amount of the first power storage device 4 decreases during the driving and the first power storage device 4 is replaced at a drive-in charging station, the second power storage device 5 can be charged more quickly than in a case where the second power storage device 5 starts to be charged only while the start switch 12 of the vehicle is ON.

The first power storage device 4 charges the second power storage device 5 when the start switch 12 is ON, the accelerator operator 6 is not operated, and the rotation speed of the motor 1 is equal to or lower than the predetermined rotation speed. Therefore, the first power storage device 4 can charge the second power storage device 5 when the vehicle is stopped during driving. Thus, the frequency of charging can be increased compared with a case where the second power storage device 5 is not charged when the vehicle is stopped during driving. Accordingly, the power storage capacity of the second power storage device 5 can be reduced.

During the power driving of the motor 1, the energy is supplied from the first power storage device 4 to the inverter 2 while stepping down the output voltage of the first power storage device 4 so that the output voltage of the first power storage device 4 becomes equal to or higher than the voltage of the second power storage device 5. Therefore, it is possible to prevent a current flow from the second power storage device 5 to the motor 1. During the regeneration in the motor 1, the energy is recovered into the first power storage device 4 while stepping up the voltage of the inverter 2 at the motor rotation speed equal to or higher than the motor rotation speed where the DC voltage of the inverter 2 becomes higher than the voltage of the second power storage device 5. Therefore, it is possible to prevent a current flow from the second power storage device 5 to the first power storage device 4.

During the current control of the inverter 2, the DC voltage of the inverter 2 is controllable based on the rotation speed of the motor 1. When the rotation speed of the motor 1 is equal to or lower than the predetermined rotation speed, the DC voltage of the inverter 2 is controlled to decrease as the rotation speed of the motor 1 decreases. Therefore, the input DC voltage of the inverter 2 can be reduced during low-speed rotation, and instantaneous power of the switches can be reduced. Thus, the switching loss can be reduced during the low-speed rotation.

When the rotation speed of the motor 1 is equal to or lower than the predetermined rotation speed during the current control of the inverter 2, the DC voltage of the inverter 2 is controlled based on the peak value of the motor line-to-line voltage. Therefore, a fixed PAM switching pattern for reducing the low-order harmonic component having a switching frequency that is about three times as high as the fundamental waveform frequency can be used as the switching pattern. Thus, the switching frequency can become $\frac{1}{30}$ or lower than switching frequency in the PWM control (duty control at a constant inverter DC voltage), and the switching loss can become $\frac{1}{30}$ or lower than switching loss in the PWM control.

Although the embodiments are described above, the present disclosure is not limited to the embodiments. For example, the first power storage device 4 may be a power storage device in another form with a higher-voltage characteristic than the second power storage device 5, or the second power storage device 5 may be a power storage device in another form with a lower-voltage characteristic than the first power storage device 4. The semiconductor switching element may be an IGBT in place of the MOSFET. The present disclosure may be applied to a vehicle without the monitor 13, to a vehicle connected to an auxiliary device different from the monitor 13 (for example, other electrical equipment operating by using the second power storage device 5 as a power supply), or to a three-wheel or four-wheel vehicle such as a buggy.

The present disclosure is also applicable to a motor vehicle with a different appearance or with other functions as long as the power converter steps down the output voltage of the power storage device during the power driving of the motor to supply energy from the power storage device to the inverter, and steps up the DC voltage of the inverter during the regeneration in the motor to recover regenerated energy into the power storage device.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A motor vehicle comprising:
   a motor performing power driving and regeneration;
   an inverter converts a direct current into an alternating current;
   a power storage device supplies energy to the motor;
   a power converter with a voltage step down function during the power driving and a voltage step up function during the regeneration; and
   a circuit where the power converter, with the voltage step down function during the power driving, is connected to the power storage device,
   during the power driving of the motor, the power converter steps down an output voltage of the power storage device to supply the energy from the power storage device to the inverter,
   during the regeneration in the motor, the power converter steps up a DC voltage of the inverter to recover regenerated energy into the power storage device;
   wherein the power storage device is a first power storage device having a high-voltage characteristic;
   a second power storage device having a low-voltage characteristic;
   an auxiliary device operating by using the second power storage device as a power supply,
   wherein the second power storage device and the auxiliary device are connected to the power converter in the circuit in parallel to the inverter,
   during charging from the first power storage device to the second power storage device, an output voltage of the first power storage device is stepped down to supply energy from the first power storage device to the second power storage device;
   an accelerator operator controlling the motor to adjust a drive torque of a driving wheel; and
   a start switch enabling the motor vehicle to travel,
   wherein the energy is supplied from the first power storage device to the second power storage device when the accelerator operator is not operated, the start switch is ON, and a rotation speed of the motor is equal to or lower than a predetermined rotation speed.

2. The motor vehicle according to claim 1,
   wherein the first power storage device is mountable on and removable from the motor vehicle, wherein the motor vehicle further comprises a start switch enabling the motor vehicle to travel, and the energy is supplied from the first power storage device to the second power storage device when the start switch is OFF.

3. The motor vehicle according to claim 1, wherein, during the power driving of the motor, the energy is supplied from the first power storage device to the inverter while stepping down the output voltage of the first power storage device so that the output voltage of the first power storage device becomes equal to or higher than a voltage of the second power storage device.

4. The motor vehicle according to claim 1, wherein, during the regeneration in the motor, the energy is recovered into the first power storage device while stepping up the DC voltage of the inverter at a motor rotation speed equal to or higher than a motor rotation speed where the DC voltage of the inverter becomes higher than a voltage of the second power storage device.

5. The motor vehicle according to claim 1,
wherein, during current control of the inverter, the DC voltage of the inverter is controllable based on a rotation speed of the motor, and
wherein, when the rotation speed of the motor is equal to or lower than a predetermined rotation speed, the DC voltage of the inverter is controlled to decrease as the rotation speed of the motor decreases.

6. The motor vehicle according to claim 1, wherein, when a rotation speed of the motor is equal to or lower than a predetermined rotation speed during current control of the inverter, the DC voltage of the inverter is controlled based on a peak value of a motor line-to-line voltage.

7. The motor vehicle according to claim 1,
wherein the first power storage device is a high-voltage lithium ion battery or a high-voltage nickel-metal hydride battery, and
the second power storage device is a low-voltage lithium ion battery, a low-voltage nickel-metal hydride battery, a lithium ion capacitor, an electric double layer capacitor, or a lead-acid battery.

* * * * *

UNITED STATES PATENT AND TRADEMARK OFFICE
CERTIFICATE OF CORRECTION

PATENT NO. : 11,718,201 B2
APPLICATION NO. : 17/528060
DATED : August 8, 2023
INVENTOR(S) : Tatsuyuki Ohashi et al.

Page 1 of 1

It is certified that error appears in the above-identified patent and that said Letters Patent is hereby corrected as shown below:

In the Specification

<u>Column 7</u>
Line 53    Delete "(w)" and insert --(ω)--

Signed and Sealed this
Twenty-sixth Day of September, 2023

Katherine Kelly Vidal
*Director of the United States Patent and Trademark Office*